(12) United States Patent
Nishimine (10) Patent No.: US 10,337,603 B2
(45) Date of Patent: *Jul. 2, 2019

(54) LUBRICATING STRUCTURE FOR HYBRID VEHICLE

(71) Applicant: TOYOTA JIDOSHA KABUSHIKI KAISHA, Toyota-shi (JP)

(72) Inventor: Akiko Nishimine, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 262 days.

This patent is subject to a terminal disclaimer.

(21) Appl. No.: 15/067,277

(22) Filed: Mar. 11, 2016

(65) Prior Publication Data

US 2016/0265652 A1 Sep. 15, 2016

(30) Foreign Application Priority Data

Mar. 13, 2015 (JP) ................................ 2015-050649

(51) Int. Cl.
*F16H 57/08* (2006.01)
*F16H 3/72* (2006.01)
(Continued)

(52) U.S. Cl.
CPC ......... *F16H 57/0482* (2013.01); *B60K 6/365* (2013.01); *B60K 6/445* (2013.01);
(Continued)

(58) Field of Classification Search
None
See application file for complete search history.

(56) References Cited

U.S. PATENT DOCUMENTS 5,662,188 A 9/1997 Ito et al.
5,799,744 A * 9/1998 Yamaguchi ............ B60K 6/365
180/65.235
(Continued)

FOREIGN PATENT DOCUMENTS

CN 103085807 A 5/2013
JP 08-105520 A 4/1996
(Continued)

OTHER PUBLICATIONS

Notice of Allowance issued to U.S. Appl. No. 14/944,588 dated Mar. 27, 2017.

*Primary Examiner* — Charles A Fox
*Assistant Examiner* — Ryan P Dodd
(74) *Attorney, Agent, or Firm* — Oblon, McClelland, Maier & Neustadt, L.L.P.

(57) ABSTRACT

A lubricating structure is for a hybrid vehicle that includes an engine, a first motor, and a second motor as driving force sources. The lubricating structure includes a planetary gear mechanism, a brake mechanism, an oil pump, and a first oil supply mechanism. The brake mechanism selectively fixes a carrier of the planetary gear mechanism by stopping rotation of the carrier. The oil pump is driven by a predetermined power to generate a hydraulic pressure of oil in a state in which the rotation of the carrier is stopped by the brake mechanism. The first oil supply mechanism feeds the oil to an axis portion of each of pinion gears of the planetary gear mechanism by the oil pump generating the hydraulic pressure.

3 Claims, 8 Drawing Sheets

(51) Int. Cl.
- *B60K 6/365* (2007.10)
- *F16H 57/04* (2010.01)
- *B60K 6/48* (2007.10)
- *F16H 1/28* (2006.01)
- *B60K 6/445* (2007.10)
- *B60W 10/06* (2006.01)
- *B60W 10/08* (2006.01)
- *B60W 10/30* (2006.01)
- *B60W 20/15* (2016.01)

(52) U.S. Cl.
CPC ............... *B60K 6/48* (2013.01); *B60W 10/06* (2013.01); *B60W 10/08* (2013.01); *B60W 10/30* (2013.01); *B60W 20/15* (2016.01); *F16H 1/28* (2013.01); *F16H 57/043* (2013.01); *F16H 57/0439* (2013.01); *F16H 57/0457* (2013.01); *F16H 57/0479* (2013.01); *F16H 57/082* (2013.01); *Y02T 10/6239* (2013.01); *Y02T 10/6286* (2013.01); *Y10S 903/91* (2013.01)

(56) References Cited

U.S. PATENT DOCUMENTS

| | | | |
|---|---|---|---|
| 7,967,712 B2 * | 6/2011 | Nakamura | F16H 57/0482 384/473 |
| 9,688,132 B2 * | 6/2017 | Nishimine | B60K 6/445 |
| 2009/0314565 A1 * | 12/2009 | Suzuki | B60K 6/365 180/65.285 |
| 2010/0320019 A1 | 12/2010 | Gale et al. | |
| 2011/0166727 A1 * | 7/2011 | Light | B60K 6/445 701/22 |
| 2011/0230292 A1 * | 9/2011 | Komatsu | B60K 6/365 475/5 |
| 2012/0143422 A1 | 6/2012 | Kitahata et al. | |
| 2013/0283972 A1 * | 10/2013 | Yamamoto | B60K 6/405 74/665 B |
| 2013/0305878 A1 * | 11/2013 | Seno | F16H 57/0423 74/665 A |
| 2014/0358349 A1 | 12/2014 | Okuda et al. | |
| 2015/0183423 A1 * | 7/2015 | Yamamoto | B60K 6/387 477/3 |
| 2015/0211620 A1 * | 7/2015 | Matsubara | B60K 6/387 475/5 |
| 2015/0224868 A1 | 8/2015 | Makino | |
| 2015/0283992 A1 * | 10/2015 | Kawai | B60K 6/383 475/2 |
| 2016/0069231 A1 | 3/2016 | Nishimine | |
| 2016/0137050 A1 | 5/2016 | Nishimine et al. | |
| 2016/0332618 A1 * | 11/2016 | Ono | B60K 6/383 |

FOREIGN PATENT DOCUMENTS

| | | | |
|---|---|---|---|
| JP | 2011-214715 A | | 10/2011 |
| JP | 2012-106599 A | | 6/2012 |
| JP | 5385880 B2 | | 10/2013 |
| JP | WO2014083616 | * | 1/2014 |
| JP | 2014-093845 A | | 5/2014 |
| JP | WO2014013555 A1 | * | 5/2014 |
| JP | 2016-52844 A | | 4/2016 |
| JP | 2016-97752 A | | 5/2016 |
| JP | 2016-113125 A | | 6/2016 |
| KR | 10-2014-0103170 A | | 8/2014 |
| WO | WO 2014/091582 A1 | | 6/2014 |
| WO | WO2013/094043 | | 4/2015 |

* cited by examiner

LUBRICATING STRUCTURE FOR HYBRID VEHICLE

CROSS-REFERENCE TO RELATED APPLICATIONS

The present application claims the benefit of priority to Japanese Patent Application No 2015-050649 filed on Mar. 13, 2015 with the Japan Patent Office, the entire contents of which are incorporated herein by reference in entirety.

BACKGROUND OF THE DISCLOSURE

1. Field of the Disclosure

This application relates to a lubricating structure for a hybrid vehicle configured to transmit power, which is output from an engine or a motor or both, to a drive shaft is a planetary gear mechanism.

2. Description of Related Art

International Application Publication No. 2013/094043 describes an invention that relates to a hybrid vehicle. In the hybrid vehicle that uses a first motor, a second motor and an engine as driving force sources, the hybrid vehicle includes a planetary gear mechanism and a brake mechanism. The planetary gear mechanism transmits power, which is output from the first motor or the engine or both, to a wheel side. The brake mechanism stops the rotation of one rotating element (specifically, a rotating element to which an output shaft of the engine is coupled) of the planetary gear mechanism. The invention described in the international Application Publication No. 2013/094043 is intended to suppress a decrease in the durability of the above-described planetary gear mechanism. For this purpose, the controller described in the International Application Publication No. 2013/094043 is configured to, in a state where the rotation speed of each of pinion gears of the planetary gear mechanism increases, reduce as driving torque shared by the first motor within a required driving torque as the rotation speed of each pinion gear increases.

The International Application Publication No. 2013/094043 describes the configuration of a powertrain including a single-pinion-type planetary gear mechanism as an example of a vehicle that is a controlled target. The single-pinion-type planetary gear mechanism includes a sun gear, a ring gear and a carrier. The first motor is coupled to the sun gear. The second motor and the drive shaft are coupled to the ring gear via a gear train. The engine is coupled to the carrier via the brake mechanism. With such a configuration, by outputting torque from both the first motor and the second motor in a state where the rotation of the engine and the rotation of the carrier are stopped and locked by the brake mechanism, it is possible to efficiently cause the vehicle to perform motor running at high power. That is, as indicated by the dashed line in the nomograph of FIG. 3 in the international Application Publication No. 2013/094043, during motor running using the two motors as described above, the rotary shaft of the carrier and the rotary shaft of the engine are locked by engaging the brake mechanism, and the rotation speed of the carrier and the rotation speed of the engine are fixed to zero. By driving the first motor in a rotation direction opposite to the rotation direction of the second motor that is driven during ordinary motor running in this state, it is possible to perform motor running at high power.

When motor running is performed by using the two motors while the rotation of the carrier is locked as described above, the pinion gears of the planetary gear mechanism rotate at a high speed. That is, as shown in FIG. 3 in the International Application Publication No. 2013/094043, the sun gear coupled to the first motor and the ring gear coupled to the second motor rotate in mutually opposite directions, so the rotation speed of each pinion gear increases as the rotation speeds of those first motor and second motor increase. Because the first motor outputs torque, a load that is exerted on the pinion gears also increases. Therefore, the temperature of the pinion gears rises, which leads to a state where seizure or abrasion easily occurs. Against such an inconvenience, in the controller described in the International Application Publication No. 2013/094043, the output of the first motor is more limited as the rotation speed of each pinion gear increases, and an increase in the rotation speed of each pinion gear is suppressed, as described above. Therefore, an excessive increase in the rotation speed of each pinion gear is avoided, so it is possible to suppress a decrease in the durability of the planetary gear mechanism due to seizure or abrasion of the pinion gears.

Even in a state where an increase in the rotation speed of each pinion gear is suppressed by limiting the output of the first motor as described above, it is required to supply oil to the pinion gears for lubrication and cooling. However, in the International Application Publication No. 2013/094043, the amount, state, or the like, of oil that is supplied to the planetary gear mechanism is not sufficiently taken into consideration. When the rotation of the carrier and the rotation of the engine are locked by the brake mechanism as described above, an oil pump that is driven by the engine stops. Therefore, supply of oil to the planetary gear mechanism and the like, in that case is generally limited to splash lubrication by the use of gears. In splash lubrication by the use of gears, it is possible to lubricate and cool the surfaces of the above-described pinion gears; however, there is a case where lubrication and cooling performance may not be sufficient for the inside of each pinion gear and a pinion shaft supporting each pinion gear.

Figure 9:
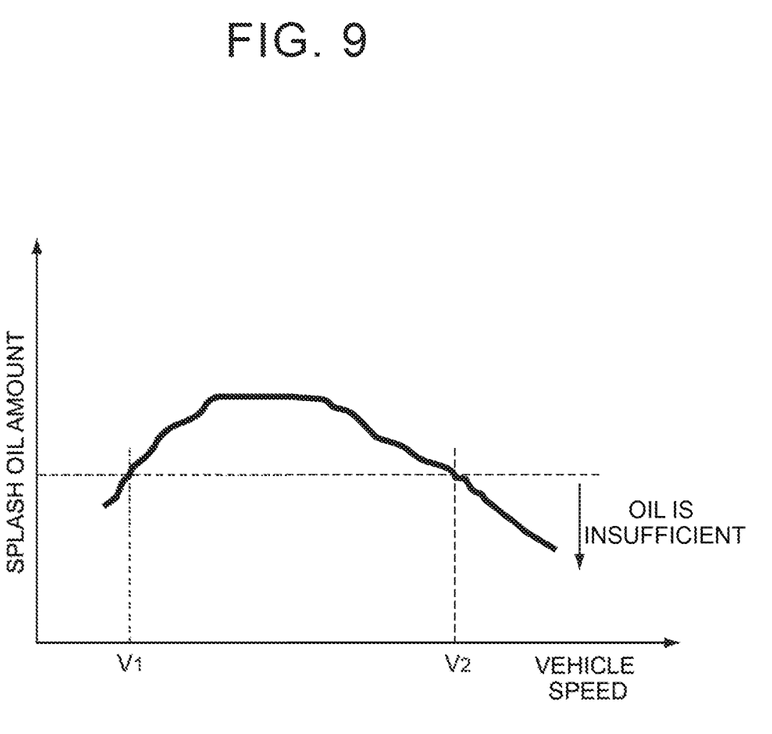
FIG. 9 is a graph for illustrating the relationship between a vehicle speed and the amount of oil that is splashed by a typical splash lubrication mechanism.

The amount and state of oil that is supplied through the above-described splash lubrication change depending on an oil temperature and a vehicle speed. For example, as shown in FIG. 9, when the vehicle speed is low, the rotation speed of each of gears that splash oil is low, so the amount of oil supplied reduces as compared to when the vehicle speed is intermediate or high. When the viscosity of oil is high because of a low oil temperature as well, the amount of oil supplied reduces. When the viscosity of oil is low because of a high oil temperature or when the rotation speed of each pinion gear is high because of a high vehicle speed, oil supplied to the pinion gears does not adhere to the pinion gears and is rejected because of centrifugal force, with the result that the amount of oil that is supplied to the pinion gears decreases.

In this way, when the planetary gear mechanism that transmits power in a state where the rotation of the carrier is locked as in the case of the hybrid vehicle described in the International Application Publication No. 2013/094043 is used, there is still room for improvement in order to appropriately supply oil to the pinion nears the planetary gear mechanism for the purpose of lubrication and cooling of the pinion gears.

SUMMARY

This disclosure provides a lubricating structure for a hybrid vehicle, which is able to appropriately supply oil for lubrication and cooling to a gear transmission mechanism that transmits the output torque of a driving force source to a drive shaft side.

A lubricating structure related to the present disclosure is for a hybrid vehicle. The vehicle includes an engine, a first motor and a second motor as driving force sources. The lubricating structure includes a planetary gear mechanism, a brake mechanism, an oil pump and a first oil supply mechanism. The planetary gear mechanism includes a sun gear, a ring gear, a carrier and pinion gears. The first motor is coupled to the sun gear. An output shaft is coupled to the ring gear. The engine is coupled to the carrier. The brake mechanism is configured to selectively fix the carrier by stopping rotation of the carrier. The oil pump is configured to be driven by predetermined power to generate hydraulic pressure in a state where the rotation of the carrier is stopped by the brake mechanism. The first oil supply mechanism is configured to feed the oil to an axis portion of each pinion near by generating the hydraulic pressure with the use of the oil pump.

With this lubricating structure, when the planetary gear mechanism transmits power in a state where the rotation of the carrier is locked by the brake mechanism, it is possible to supply oil under pressure to the axis portion of each pinion gear, which is supported by the carrier, by the oil supply mechanism that uses the oil pump as a hydraulic pressure source. Therefore, when the rotation of the carrier is locked and the rotation speed of each pinion gear increases or when a load that is exerted on the pinion gears increases and the temperature of the pinion gears rises, it is possible to effectively lubricate and cool the axis portion of each pinion gear by the use of oil fed under pressure. Therefore, it is possible to improve the durability of the planetary gear mechanism by suppressing abrasion of the pinion gears and preventing seizure between each pinion gear and the rotary shaft of the pinion gear.

The lubricating structure may further include a third motor and an electronic control unit. The oil pump may be an electric oil pump configured to be driven by the third motor to generate hydraulic pressure. The electronic control unit may be configured to control a rotation state of each of the driving force sources and a rotation state of the third motor. The electronic control unit may be configured to, when both the first motor and the second motor output torque, control the third motor such that the oil pump generates hydraulic pressure.

With this lubricating structure, when both the first motor and the second motor output torque at the same time, it is possible to drive the electric oil pump and feed oil to the pinion gears under hydraulic pressure that is generated by the electric oil pump. Therefore, even when both the first motor and the second motor output torque and a load that is exerted on the planetary gear mechanism increases, it is possible to appropriately lubricate and cool the pinion gears by the use of oil that is fed under pressure.

The lubricating structure may further include a second oil supply mechanism configured to supply the planetary gear mechanism with oil that is splashed at the time when a predetermined gear rotates. The electronic control unit may be configured to, when a vehicle speed falls outside a predetermined vehicle speed range, control the third motor such that the oil pump generates hydraulic pressure. The predetermined vehicle speed range may be set as a vehicle speed range in which a predetermined amount of oil is supplied by the second oil supply mechanism.

With this lubricating structure, when the vehicle speed falls outside the predetermined vehicle speed range, that is, when the vehicle travels at a low speed lower than or equal to the predetermined vehicle speed range or travels at a high speed higher than or equal to the predetermined vehicle speed range, it is possible to drive the electric oil pump and feed oil to the pinion gears under hydraulic pressure that is generated by the electric oil pump. Therefore, even when the amount of oil that is supplied by the second oil supply mechanism is small because of a low vehicle speed or when oil supplied to the pinion gears tends to be rejected because of a high vehicle speed, it is possible to appropriately lubricate and cool the pinion gears by the use of oil that is fed under pressure.

The electronic control unit may be configured to, when a temperature of the oil is lower than a predetermined temperature, prohibit driving of at least any one of the first motor and the second motor.

With this lubricating structure, when the temperature of oil that is supplied to the pinion gears is lower than the predetermined temperature, driving of at least any one of the first motor and the second motor is prohibited. That is, driving of both the first motor and the second motor at the same time is prohibited. When the oil temperature is low, the viscosity of oil is high, so the discharge capacity of the oil pump decreases. In such a case, both the first motor and the second motor are not driven at the same time. Therefore, it is possible to avoid a situation that both the first motor and the second motor are driven although the discharge capacity of the oil pump decreases and a large load is exerted on the pinion gears.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF ILLUSTRATIVE EMBODIMENTS

Figure 1:
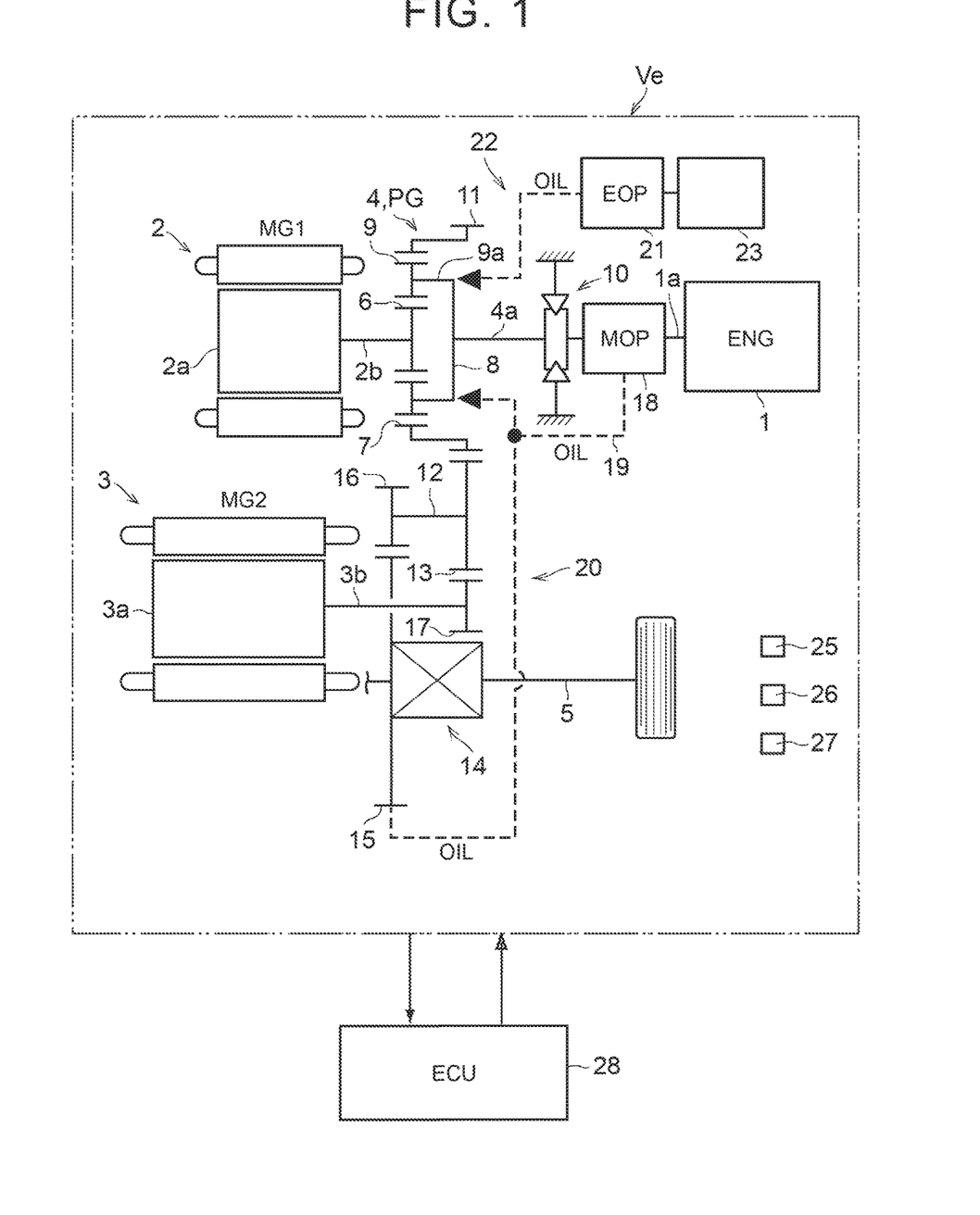
FIG. 1 is a view that shows an example of a hybrid vehicle to which the lubricating structure according to a non-limiting illustrative embodiment is applicable and an example of an oil supply mechanism in the lubricating structure according to the non-limiting illustrative embodiment.

The disclosure will be specifically described with reference to the accompanying drawings. FIG. 1 shows an example of a hybrid vehicle that may be a controlled target according to a non-limiting illustrative embodiment. A vehicle Ve shown in FIG. 1 is the hybrid vehicle that includes an engine (ENG) 1, a first motor (MG1) 2 and a second motor (MG2) 3 as driving force sources. The vehicle Ve is configured to split power, which is output from the engine 1, by a power split device 4 and transmit the split power to the first motor 2 side and to a drive shaft 5 side. The vehicle Ve is also configured to be able to supply electric power, generated by the first motor 2, to the second motor 3 and add power, which is output from the second motor 3, to the drive shaft 5.

Each of the first motor 2 and the second motor 3 is a motor having a power generating function (so-called motor generator), and is, for example, a permanent magnet synchronous motor, or the like. Each of the first motor 2 and the second motor 3 is connected to a battery via an inverter, and is configured such that the rotation speed, the torque, switching between the function of a motor and the function of a generator, and the like, are electrically controlled.

The power split device 4 is formed of a planetary gear mechanism PG including a sun gear 6, a ring gear 7 and a carrier 8. In the example shown in FIG. 1, the single-pinion-type planetary gear mechanism PG is used.

The planetary gear mechanism PG is arranged along the same rotation axis as an output shaft 1a of the engine 1. The first motor 2 is coupled to the sun gear 6 of the planetary gear mechanism PG. The first motor 2 is arranged next to the planetary gear mechanism PG across from the engine 1. A rotor shaft 2b that rotates integrally with a rotor 2a of the first motor 2 is coupled to the sun gear 6. The ring gear 7, which is an internal gear, is arranged concentrically with respect to the sun gear 6. Pinion gears 9 are in mesh with the sun gear 6 and the ring gear 7. The pinion gears 9 are held by the carrier 8 so as to be rotatable and revolvable. An input shaft 4a of the power split device 4 is coupled to the carrier 8. The output shaft 1a of the engine 1 is coupled to the input shaft 4a via a one-way clutch 10.

The one-way clutch 10 is such a clutch mechanism that a rotating member is engaged with a fixed member when torque in a direction opposite to the rotation direction of the engine 1 acts on the one-way clutch 10. The fixed member is fixed to a housing, or the like, so as to be non-rotatable. The rotating member is coupled to the output shaft 1a and the carrier 8. Therefore, the one-way clutch 10 is configured to, when torque in a direction opposite to the rotation direction of the engine 1 acts on the output shaft 1a or the carrier 8, be engaged to stop the rotation of the output shaft 1a or the carrier 8. By using the thus configured one-way clutch 10, it is possible to stop the rotation of each of the output shaft 1a and the carrier 8 in response to the direction in which torque acts. As will be described later, the one-way clutch 10 functions as a brake mechanism for stopping the rotation of the output shaft 1a of the engine 1 when the vehicle lie is caused to travel in EV mode by using torque output from both the first motor 2 and the second motor 3. Therefore, instead of the one-way clutch 10, for example, a friction brake, or the like, configured to selectively stop the rotation of the output shaft 1a by controlling an engagement state of the friction brake, or the like, may be used.

A drive gear 11, which is an external gear, is integrally formed at the outer peripheral portion of the ring gear 7 of the planetary gear mechanism PG. A counter shaft 12 is arranged parallel to the rotation axis of the planetary gear mechanism PG, the first motor 2, or the like. A counter driven gear 13 is connected to one (right-side in FIG. 1) end of the counter shaft 12 so as to rotate integrally with the counter shaft 12. The counter driven gear 13 is in mesh with the drive gear 11. A counter drive gear 16 is connected to the other (left-side in FIG. 1) end of the counter shaft 12 so as to rotate integrally with the counter shaft 12. The counter drive gear 16 is in mesh with a ring gear 15 of a differential gear 14 that is a final reduction gear. Therefore, the ring gear 7 of the planetary gear mechanism PG is coupled to the drive shaft 5 via a gear train and the differential gear 14. The gear train is formed of the drive gear the counter shaft 12, the counter driven gear 13 and the counter drive gear 16.

Torque that is output from the second motor 3 is allowed to be added to torque that is transmitted from the planetary gear mechanism PG to the drive shaft 5. That is, a rotor shaft 3b that rotates integrally with a rotor 3a of the second motor 3 is arranged parallel to the counter shaft 12. A reduction gear 17 coupled to the rotor shaft 3b is in mesh with the counter driven gear 13. Therefore, the drive shaft 5 and the second motor 3 are coupled to the ring gear 7 of the planetary gear mechanism PG via the above-described gear train or the reduction gear 17.

As described above, in the vehicle Ve, the output shaft 1a of the engine 1 and the rotor shaft 2b of the first motor 2 are coupled to the drive shaft 5-side gear train and the differential gear 14 via the planetary gear mechanism PG. That is, torque output from the engine 1 and the first motor 2 is transmitted to the drive shaft 5 side via the power split device 4 formed of the planetary gear mechanism PG.

An oil pump 18 is provided in the vehicle Ve in order to lubricate and cool the planetary gear mechanism PG. The oil pump 18 (hereinafter, MOP 18) is a general mechanical oil pump that is conventionally used for an engine or a transmission for a vehicle as a pump for supplying oil and controlling hydraulic pressure. The MOP 18 is configured to be driven by torque that is output from the engine 1 to generate hydraulic pressure. Specifically, the rotor of the MOP 18 is configured to rotate together with the output shaft 1a of the engine 1. Therefore, when the engine 1 is operated through combustion to output torque from the output shaft 1a, the MOP 18 is also driven to generate hydraulic pressure.

When the MOP 18 generates hydraulic pressure, oil that is discharged from the MOP 18 is supplied to the planetary gear mechanism PG via an oil passage 19. Oil is also supplied to the planetary gear mechanism PG by a splash lubrication mechanism 20 formed of the ring gear 15 of the differential gear 14.

The splash lubrication mechanism 20 is a configuration that is conventionally generally used as a lubrication mechanism for a portion at which gears are used. For example, the splash lubrication mechanism 20 is provided such that the tooth tip portions of the ring gear 15 are immersed in oil in an oil pan, or the like. When the ring gear 15 rotates by the use of torque that is transmitted from the drive shaft 5 side, oil splashed from the oil pan is supplied to the planetary gear mechanism PG. Therefore, even when the rotation of the output shaft 1a of the engine 1 is stopped, it is possible to supply oil to the planetary gear mechanism PG in a state where the vehicle Ve is traveling and the drive shaft 5 is rotating.

The MOP 18 is not able to generate hydraulic pressure when the rotation of the output shaft 1a of the engine 1 is stopped. While the vehicle Ve is traveling, it is possible to supply oil to the planetary gear mechanism PG with the use of the splash lubrication mechanism 20. However, because the splash lubrication mechanism 20 is configured to supply oil, once splashed upward by the ring gear 15, to the planetary gear mechanism PG under the action of gravity, the splash lubrication mechanism 20 has lower lubrication and cooling performance than a forced lubrication mechanism that feeds oil under hydraulic pressure. As described above, the lubrication and cooling performance of the splash lubrication mechanism 20 changes depending on an oil temperature and a vehicle speed.

Therefore, in order to keep supplying oil to the planetary gear mechanism PG and appropriately lubricate and cool the planetary gear mechanism PG even when the engine 1 is stopped or when the lubrication and cooling performance of the splash lubrication mechanism 20 is insufficient, the vehicle Ve includes an oil pump 21 and an oil supply mechanism 22. The oil supply mechanism 22 supplies oil to the planetary gear mechanism PG under pressure with the use of the oil pump 21 as a hydraulic pressure source.

In the example shown in FIG. 1, the oil pump 21 (hereinafter, EOP 21) is an electric oil pump that generates hydraulic pressure when the electric oil pump is driven by torque that is output from an electric motor. Therefore, the EOP 21 is provided in association with a pump motor 23 for driving the EOP 21. The pump motor 23 is a third electric motor other than the driving force sources of the vehicle Ve, such as the engine 1, the first motor 2 and the second motor 3, and is provided exclusively for the EOP 21 in the example shown in FIG. 1.

When the EOP 21 generates hydraulic pressure, oil that is discharged from the EOP 21 is supplied to the planetary gear mechanism PG via the oil supply mechanism 22. Specifically, oil is supplied under pressure to the axis portion of each of the pinion gears 9 of the planetary gear mechanism PG.

Figure 2:
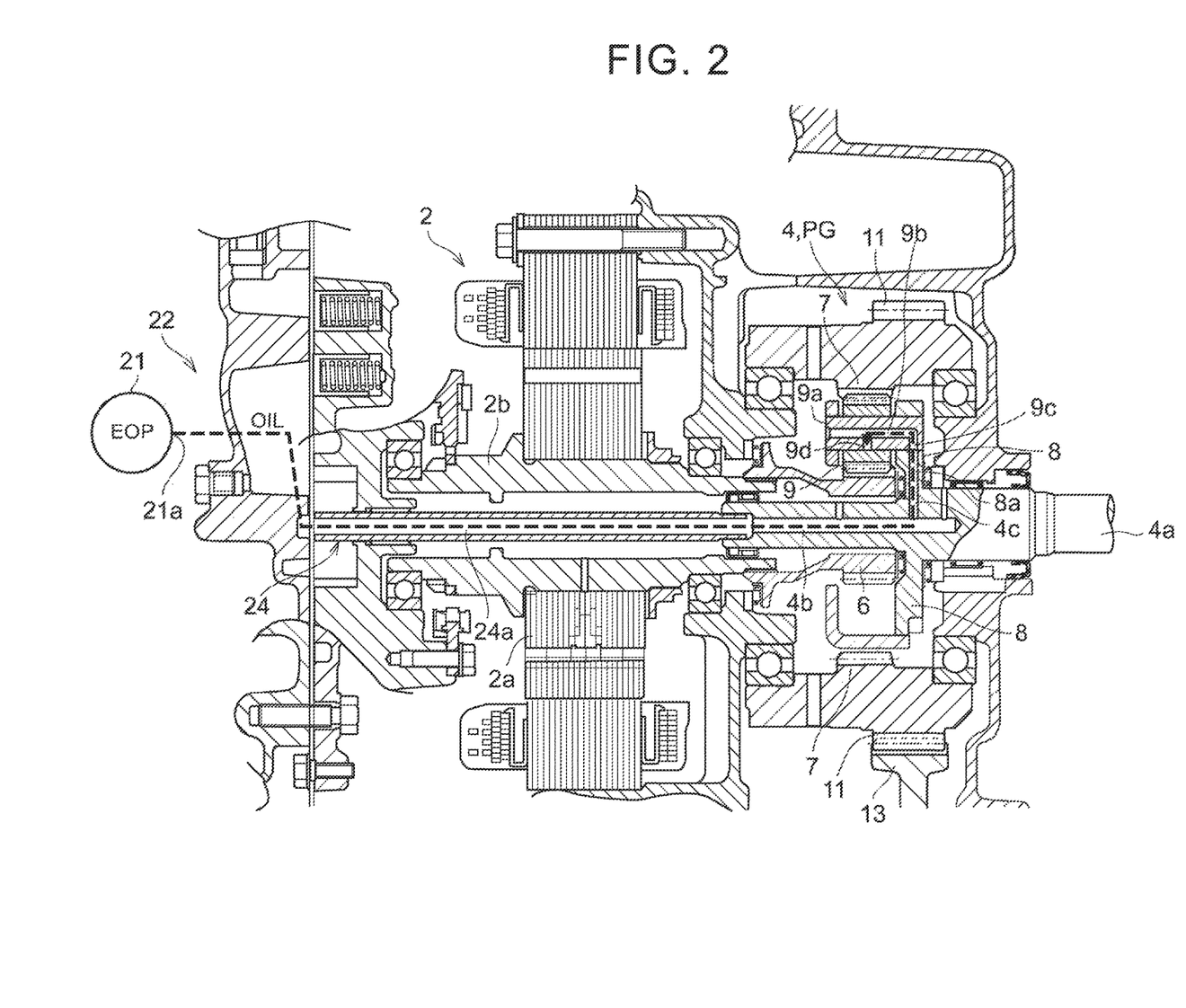
FIG. 2 is a cross-sectional view for illustrating the detailed configuration of the oil supply mechanism shown in FIG. 1.
Figure 3:
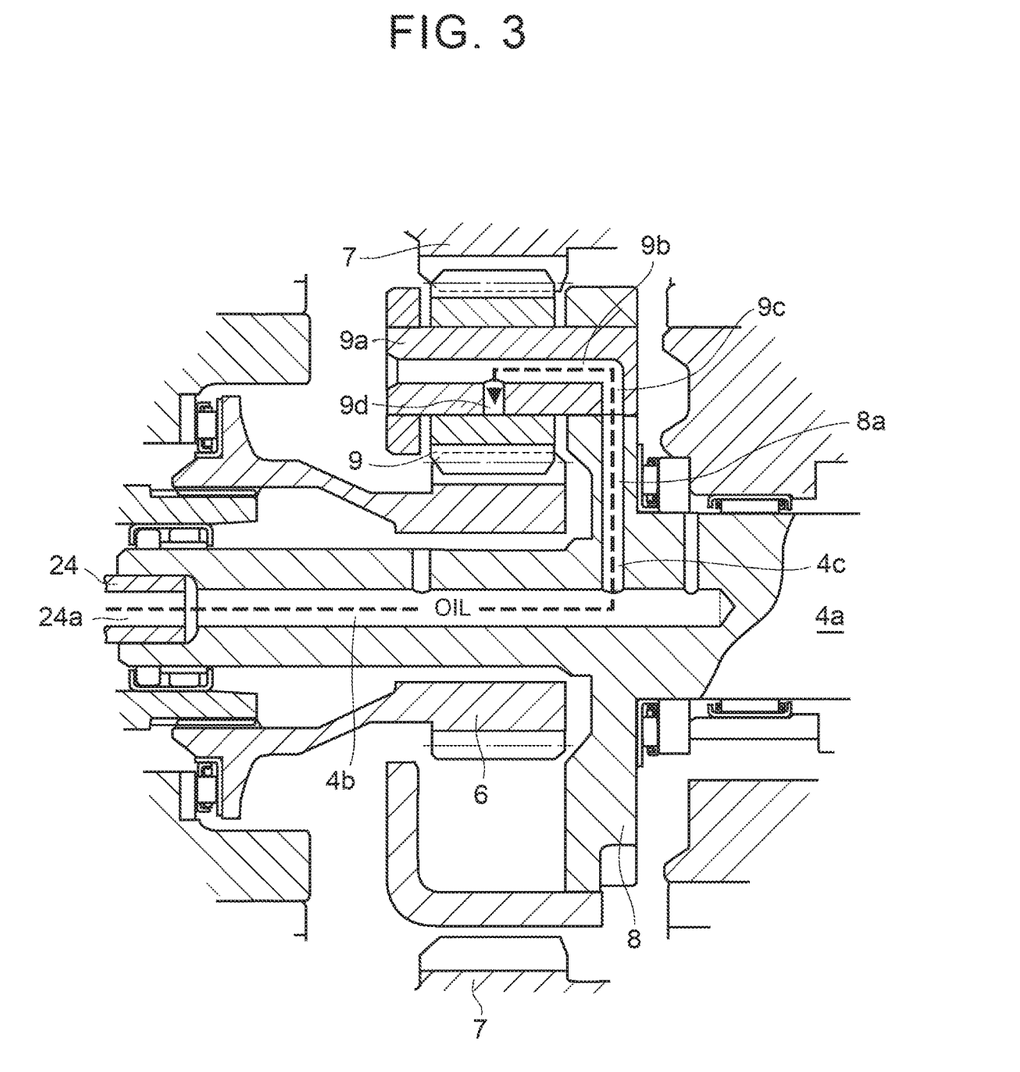
FIG. 3 is a partially enlarged cross-sectional view of the configuration of the oil supply mechanism shown in FIG. 2.

FIG. 2 and FIG. 3 show the thither detailed configuration of the oil supply mechanism 22. In the examples shown in FIG. 2 and FIG. 3, the oil supply mechanism 22 is formed of an oil passage 24a, oil passages 4b, 4c, an oil passage 8a and oil passages 9b, 9c, 9d. The oil passage 24a is provided at the hollow portion of a supply pipe 24. The oil passages 4b, 4c are provided inside the input shaft 4a. The oil passage 8a is provided inside the carrier 8. The oil passages 9b, 9c, 9d are provided inside each pinion shaft 9a.

The rotor shaft 2b of the first motor 2 is a hollow shaft of which the axis portion is hollowed. The supply pipe 24 is, for example, a metal tubular member, and is arranged in the hollow portion provided in the rotor shaft 2b as described above. A discharge port 21a of the EOP 21 communicates with one (left-side in FIG. 2) end of the supply pipe 24. The other (right-side in FIG. 2) end of the supply pipe 24 is connected to one (left-side in FIG. 2) end of the input shaft 4a. The supply pipe 24 and the input shaft 4a are fitted to each other such that the input shaft 4a is relatively rotatable with respect to the supply pipe 24 and oil is allowed to flow between the oil passage 24a of the supply pipe 24 and the oil passage 4b of the input shaft 4a while keeping hydraulic pressure.

The oil passage 4b of the input shaft 4a communicates with the oil passage 8a via the oil passage 4c. The oil passage 4c is provided so as to extend through from the oil passage 4b to the outer surface of the input shaft 4a in the radial direction of the input shaft 4a. The oil passage 8a is provided so as to extend in the radial direction inside the carrier 8. The oil passage 4b and the oil passage 4c are integrally provided inside the input shaft 4a. The oil passage 4c and the oil passage 8a are connected to each other such that oil is allowed to flow while keeping hydraulic pressure.

Each pinion shaft 9a has the oil passage 9b and the oil passage 9c. The oil passage 9b is provided by hollowing the axis portion of the pinion shaft 9a. The oil passage 9c extends through from the oil passage 9b to the outer surface of the pinion shaft 9a in the radial direction of the pinion shaft 9a. The oil passage 9b and the oil passage 9c are integrally provided inside the pinion shaft 9a. The oil passage 9d is provided in the middle of the oil passage 9b. As well as the oil passage 9c, the oil passage 9d is provided so as to extend through from the oil passage 9b to the outer surface of the pinion shaft 9a in the radial direction of the pinion shaft 9a. The opening of the oil passage 9d is provided at a position at which the opening faces the radially inner face of an axial hole of the pinion gear 9 that is fitted to the pinion shaft 9a.

As described above, the oil passage 8a provided in the carrier 8 and the oil passage 9c provided in each pinion shaft 9a are connected to each other such that oil is allowed to flow while keeping hydraulic pressure. Therefore, the oil supply mechanism 22 is configured to supply oil, discharged from the EOP 21 at a predetermined hydraulic pressure, to the axis portion of each pinion gear 9, that is, each pinion shaft 9a and the radially inner portion of the axial hole of each pinion gear 9 via the above-described oil passages under pressure.

The vehicle Ve includes a vehicle speed sensor 25. The vehicle speed sensor 25 detects the speed of the vehicle Ve. It is possible to estimate the amount of oil that is supplied to the planetary gear mechanism PG by the above-described splash lubrication mechanism 20 and an oil supply mechanism on the basis of the vehicle speed detected by the vehicle speed sensor 25. The oil supply system uses a mechanical oil pump 29 (described later) driven by the drive shaft.

An oil temperature sensor 26 is provided. The oil temperature sensor 26 is used to detect the temperature of oil that is supplied to oil supplied portions by the MOP 18 or the EOP 21. The oil temperature sensor 26 is, for example, configured to detect the temperature of oil that is stored in the oil pan, or the like. It is possible to estimate the viscosity or flowability of oil on the basis of the oil temperature detected by the oil temperature sensor 26.

A rotation speed sensor 27 is provided. The rotation speed sensor 27 detects the rotation speed of the first motor 2 and the rotation speed of the second motor 3. It is possible to obtain the output torque of the first motor 2 and the output torque of the second motor 3 on the basis of the rotation speeds of the first motor 2 and second motor 3, detected by the rotation speed sensor 27, values of currents that are respectively supplied to the first motor 2 and the second motor 3, and the like.

A controller 28 (hereinafter, ECU 28) is provided in order to execute control for operating the engine 1, control for rotating the first motor 2 and the second motor 3, control for rotating the pump motor 23, and the like. The ECU 28 is, for example, mainly formed of a microcomputer. For example, detected data of the vehicle speed sensor 25, the oil temperature sensor 26, the rotation speed sensor 27, and the like, are input to the ECU 28. The ECU 28 is configured to execute computation by using those input data, prestored data, and the like, and output a control command signal on the basis of the computed result.

The thus configured vehicle Ve is controlled by effectively utilizing the engine 1, the first motor 2 and the second motor 3 as the driving force sources such that energy efficiency or fuel economy improves. Specifically, an HV mode or an EV mode is selected as needed in response to the traveling state of the vehicle Ve. In the HV mode, the vehicle Ve is caused to travel by using the output of at least the engine 1. In the EV mode, the vehicle Ve is caused to travel by using the output of at least one of the first motor 2 and the second motor 3 while the operation of the engine 1 is stopped.

Between the above-described drive modes, particularly, the EV mode is divided into a first EV mode and a second EV mode. In the first EV mode, the vehicle Ve is caused to travel by using the output of the second motor 3. In the second EV mode, the vehicle Ve is caused to travel at high power by using the output of both the motor generators, that is, the first motor 2 and the second motor 3. The first EV mode or the second EV mode is selected as needed in response to the traveling state of the vehicle Ve.

In the first EV mode, the second motor 3 is controlled as a motor so as to be rotated in a positive direction (the rotation direction of the output shaft 1*a* of the engine 1) to output torque. The vehicle Ve is caused to travel by using a driving force generated by using torque output from the second motor 3.

In the second EV mode, the vehicle Ve is caused to travel by using the output of both the first motor 2 and the second motor 3. In the second EV mode, the first motor 2 is controlled as a motor so as to be rotated in a negative direction (the direction opposite to the rotation direction of the output shaft 1*a* of the engine 1) to output torque. The second motor 3 is controlled as a motor so as to be rotated in the positive direction to output torque. The vehicle Ve is caused to travel by using a driving force generated by the use of torque output from the first motor 2 and torque output from the second motor 3. In this case, because torque in the negative direction acts on the output shaft 1*a* of the engine 1, the one-way clutch 10 is engaged. Therefore, in a state where the rotation of the output shaft 1*a* of the engine 1 and the rotation of the carrier 8 in the planetary gear mechanism of the power split device 4 are stopped and fixed, it is possible to efficiently cause the vehicle Ve to travel by using the torque output from both the first motor 2 and the second motor 3.

As described above, the vehicle Ve is able to switch between the HV mode and the EV mode as needed in response to the traveling state, the required driving force, and the like. As described above, in the EV mode, because the operation of the engine 1 is stopped, it is not possible to generate hydraulic pressure with the use of the MOP 18. When the first EV mode of the EV mode is set, oil is particularly required to lubricate and cool the second motor 3. When the second EV mode is set, oil is particularly required to lubricate and cool the pinion gears 9 of the planetary gear mechanism PG and the pinion shafts 9*a* supporting the pinion gears 9 in addition to cooling of the first motor 2 and the second motor 3. In this case, as described above, in a state where the one-way clutch 10 is engaged and the rotation of the output shaft 1*a* and the rotation of the carrier 8 are stopped, the first motor 2 and the second motor 3 are respectively rotated in opposite directions. That is, in the planetary gear mechanism PG, the sun gear 6 and the ring gear 7 rotate in opposite directions in a state where the rotation of the carrier 8 is stopped. Therefore, the pinion gears 9 supported by the carrier 8 rotate on their axes in a state where the revolution of the pinion gears 9 around the sun gear 6 is stopped. The speed of rotation on their axes in this case is determined by the differential rotation speed between the sun gear 6 and the ring gear 7; however, the sun gear 6 and the ring gear 7 rotate in mutually opposite directions, so the pinion gears 9 rotate on their axes at a high speed. Therefore, particularly, when the second EV mode is set, it is required to supply a sufficient amount of oil to the axis portions in the planetary gear mechanism PG in order to prevent seizure of the pinion gears 9 and pinion shafts 9*a* that rotate at a high speed as described above.

When the vehicle Ve is a plug-in hybrid vehicle (PHV) that is able to charge a drive battery with electric power supplied from an external power supply and that is equipped with a battery having a relatively large capacity, the frequency of the EV mode as described above increases as compared to an ordinary hybrid vehicle (HV). In the case of such a PHV, even when the first EV mode is set, a continuous operation time in the first EV mode becomes long, and there is a case where it is required to lubricate and cool the planetary gear mechanism PG with the use of the EOP 21 as in the case where the second EV mode is set.

Therefore, in the vehicle Ve, the EOP 21 is driven when the EV mode is set or when the engine 1 is stopped. That is, hydraulic pressure is generated with the use of the EOP 21 by controlling the pump motor 23, and oil is supplied to the planetary gear mechanism PG.

As described above, particularly, when the vehicle Ve travels in the EV mode by using torque output from both the first motor 2 and the second motor 3, the pinion gears 9 of the planetary gear mechanism PG rotate at a high speed. If oil that is supplied to the planetary gear mechanism PG becomes insufficient in this case, there is a concern that seizure occurs in the pinion gears 9. The controller 28 in controlling the lubricating structure for the vehicle Ve is configured to execute control shown in the following example in order to prevent the above-described seizure.

Figure 4:
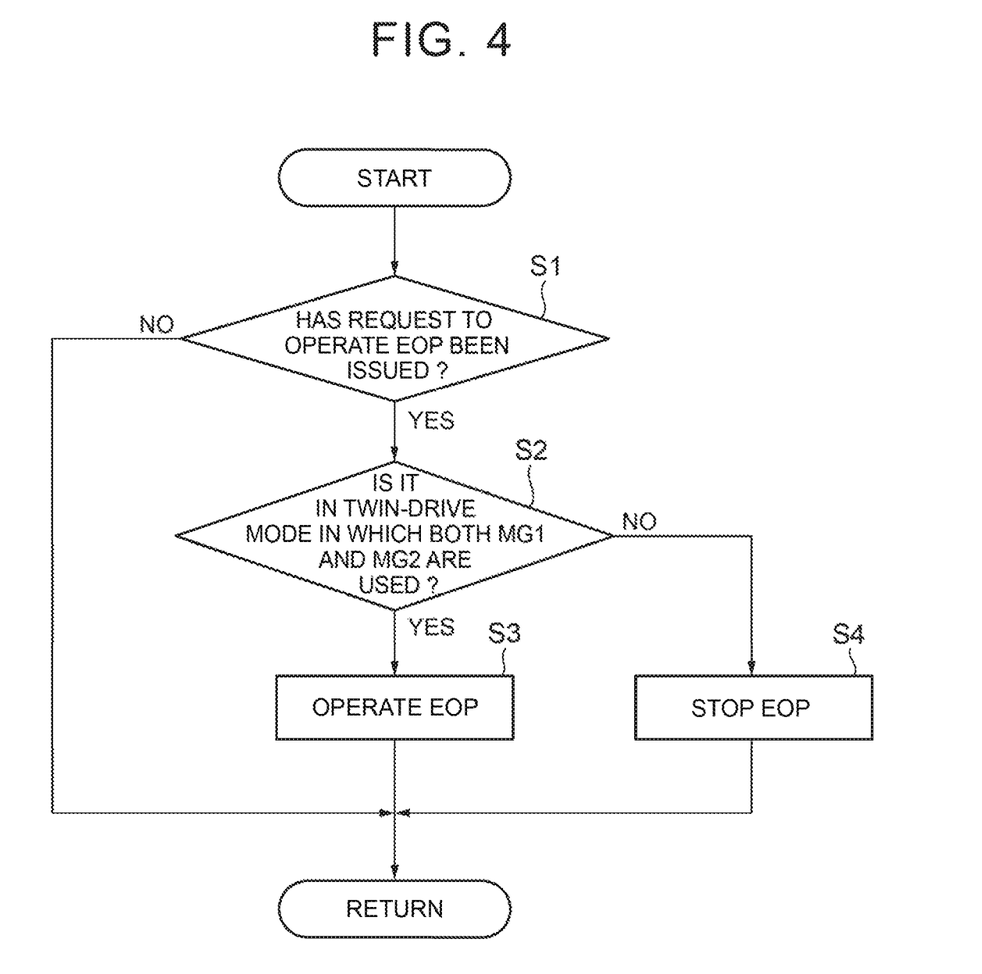
FIG. 4 is a flowchart for illustrating an example of control for activating the lubricating structure according to a non-limiting illustrative embodiment.

The flowchart of FIG. 4 shows a control example in which hydraulic pressure is generated by operating the EOP 21 when both the first motor 2 and the second motor 3 are driven. The control shown in the flowchart of FIG. 4 is, for example, executed as a result of issuance of a request to operate the EOP 21 when the operation of the engine 1 is stopped or when the EV mode is set in response to a required driving force of the vehicle. Therefore, when a request to operate the EOP 21 has not been issued yet, negative determination is made in step S1, and the routine is ended without executing the following control.

In contrast, when affirmative determination is made in step S1 as a result of the fact that a request to operate the POP 21 has been issued, the process proceeds to step S2. In step S2, it is determined whether it is in twin-drive mode in which the output of both the first motor 2 and the second motor 3 is used. That is, it is determined whether the first motor 2 is outputting torque in the EV mode.

When affirmative determination is made in step S2 as a result of the fact that the first motor 2 is outputting torque, the process proceeds to step S3. In step S3, the operation of the EOP 21 is started. That is, the EOP 21 is driven by controlling the pump motor 23. After that, the routine is once ended.

On the other hand, when negative determination is made in step S2 as a result of the fact that the first motor 2 is not outputting torque, the process proceeds to step S4. In step S4, the operation of the EOP 21 is stopped. When the operation of the EOP 21 has been already stopped, the operation stopped state is kept. After that, the routine is once ended.

In this way, with the control shown in the flowchart of FIG. 4, when the first motor 2 and the second motor 3 output at the same time, it is possible to drive the EOP 21 and feed oil to the pinion gears 9 under hydraulic pressure that is generated by the EOP 21. Therefore, even when both the first motor 2 and the second motor 3 output torque and a load that is exerted on the pinion gears 9 increases, it is possible to appropriately lubricate and cool the pinion gears 9 by the use of oil that is fed under pressure.

Figure 5:
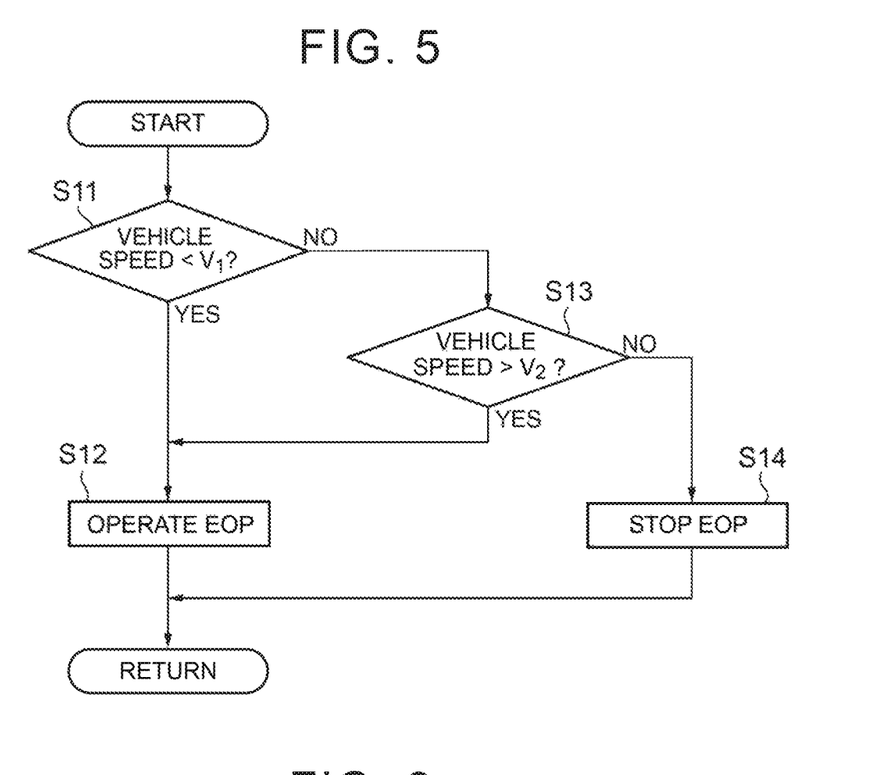
FIG. 5 is a flowchart for illustrating another example of control for activating the lubricating structure according to as non-limiting illustrative embodiment.

The flowchart of FIG. 5 shows another control example in which hydraulic pressure is generated by operating the EOP 21. The control shown in the flowchart of FIG. 5 is executed when the vehicle Ve is traveling in the twin-drive mode in which the output of both the first motor 2 and the second motor 3 is used. Initially, it is determined whether the vehicle speed is lower than a predetermined vehicle speed $V_1$ (step S11). As shown in FIG. 9, the predetermined vehicle speed $V_1$ is set in advance as a low vehicle speed-side threshold below which the amount of oil that is supplied by the splash lubrication mechanism 20 becomes insufficient.

When affirmative determination is made in step S11 as a result of the fact that the vehicle speed is lower than the predetermined vehicle speed $V_1$, the process proceeds to step S12. In step S12, the operation of the EOP 21 is started. That is, the EOP 21 is driven by controlling the pump motor 23. After that, the routine is once ended.

On the other hand, when negative determination is made in step S11 as a result of the fact that the vehicle speed is higher than or equal to the predetermined vehicle speed $V_1$, the process proceeds to step S13. In step S13, it is determined whether the vehicle speed is higher than a predetermined vehicle speed $V_2$. As shown in FIG. 9, the predetermined vehicle speed $V_2$ is set in advance as a high vehicle speed-side threshold above which the amount of oil that is supplied by the splash lubrication mechanism 20 becomes insufficient.

When affirmative determination is made in step S13 as a result of the fact that the vehicle speed is higher than the predetermined vehicle speed $V_2$, the process proceeds to step S12. In step S12, the operation of the EOP 21 is started. That is, the EOP 21 is driven by controlling the pump motor 23. After that, the routine is once ended.

When negative determination is made in step S13 as a result of the fact that the vehicle speed is lower than or equal to the predetermined vehicle speed $V_2$, the process proceeds to step S14. In step S14, the operation of the EOP 21 is stopped. When the operation of the EOP 21 has been already stopped, the operation stopped state is kept. After that, the routine is once ended.

In this way, with the control shown in the flowchart of FIG. 5, when the vehicle speed falls outside a predetermined vehicle speed range, that is, the vehicle speed is lower than the predetermined vehicle speed $V_1$ or higher than the predetermined vehicle speed $V_2$, it is possible to drive the EOP 21 and feed oil to the pinion gears 9 under hydraulic pressure that is generated by the EOP 21. Therefore, even when the amount of oil that is supplied by the splash lubrication mechanism 20 is small because of a low vehicle speed or when oil supplied to the pinion gears 9 tends to be rejected because of a high vehicle speed, it is possible to appropriately lubricate and cool the pinion gears 9 by the use of oil that is fed under pressure. When the vehicle speed falls within the above-described predetermined vehicle speed range and the amount of oil that is supplied by the splash lubrication mechanism 20 is sufficient to lubricate and cool the pinion gears 9, it is possible to reduce electric power consumption for driving the EOP 21 by stopping the EOP 21.

Figure 6:
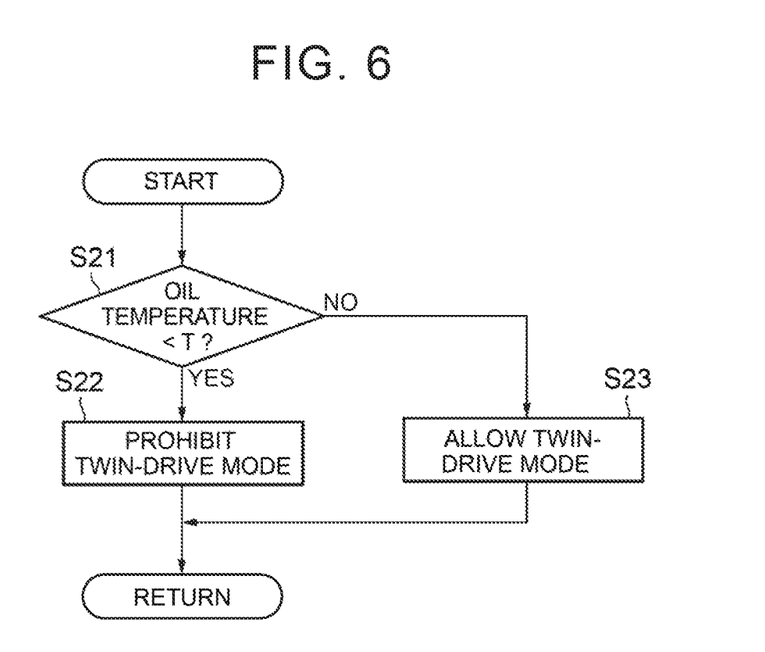
FIG. 6 is a flowchart for illustrating another example of control for activating the lubricating structure according to a non-limiting illustrative embodiment.

Another control example shown in the flowchart of FIG. 6 is an example in which motor running in the second EV mode is prohibited when the oil temperature is low. The control shown in the flowchart of FIG. 6 is executed on the basis of the oil temperature that is detected constantly. Initially, it is determined whether the oil temperature is lower than a predetermined temperature T (step S21). The predetermined temperature T is set in advance as an oil temperature threshold at which the viscosity of oil is high and the lubrication and cooling performance of the EOP 21 decreases to an unallowable level.

Therefore, when affirmative determination is made in step S21 as a result of the fact that the oil temperature is lower than the predetermined temperature T, the process proceeds to step S22. In step S22, motor running (twin-drive mode) of the vehicle Ve by the use of the output torque of both the first motor 2 and the second motor 3 is prohibited. In this case, motor running (single-drive mode) by the use of the output torque of the second motor 3 is allowed. When the twin-drive mode is prohibited in step S22, the routine is once ended after that.

On the other hand, when negative determination is made in step S21 as a result of the fact that the oil temperature is higher than or equal to the predetermined temperature T, the process proceeds to step S23. In step S23, motor running (twin-drive mode) of the vehicle Ve by the use of the output torque of both the first motor 2 and the second motor 3 in the second EV mode is enabled. That is, prohibition of the twin-drive mode is cancelled. When prohibition of the twin-drive mode is cancelled in step S23, the routine is once ended after that.

In this way, with the control shown in the flowchart of FIG. 6, when the temperature of oil that is supplied to the pinion gears 9 is lower than the predetermined temperature T, the twin-drive mode by the use of the output torque of both the first motor 2 and the second motor 3 is prohibited. When the oil temperature is low, the viscosity of oil increases, so the discharge capacity of the EOP 21 decreases. In such a case, the above-described twin-drive mode is not performed. Therefore, it is possible to avoid a situation that the twin-drive mode is performed although the discharge capacity of the EOP 21 decreases and a large load is exerted on the pinion gears 9.

The above-described controls shown in the flowcharts of FIG. 5 and FIG. 6 each may be executed solely or may be executed in combination with another control. For example, the above-described control shown in the flowchart of FIG. 4 and the above-described control shown in the flowchart of FIG. 5 may be executed in combination with each other. The above-described control shown in the flowchart of FIG. 4 and the above-described control shown in the flowchart of FIG. 6 may be executed in combination with each other. Alternatively, the above-described control shown in the flowchart of FIG. 4 and the controls shown in the flowcharts of FIG. 5 and FIG. 6 may be executed in combination with each other.

FIG. 1 shows an example in which the EOP 21 that is the electric oil pump is provided as the hydraulic pressure source of the oil supply mechanism 22. An oil pump as shown in FIG. 7 or an oil pump as shown in FIG. 8 may be used as the hydraulic pressure source of the oil supply mechanism 22.

Figure 7:
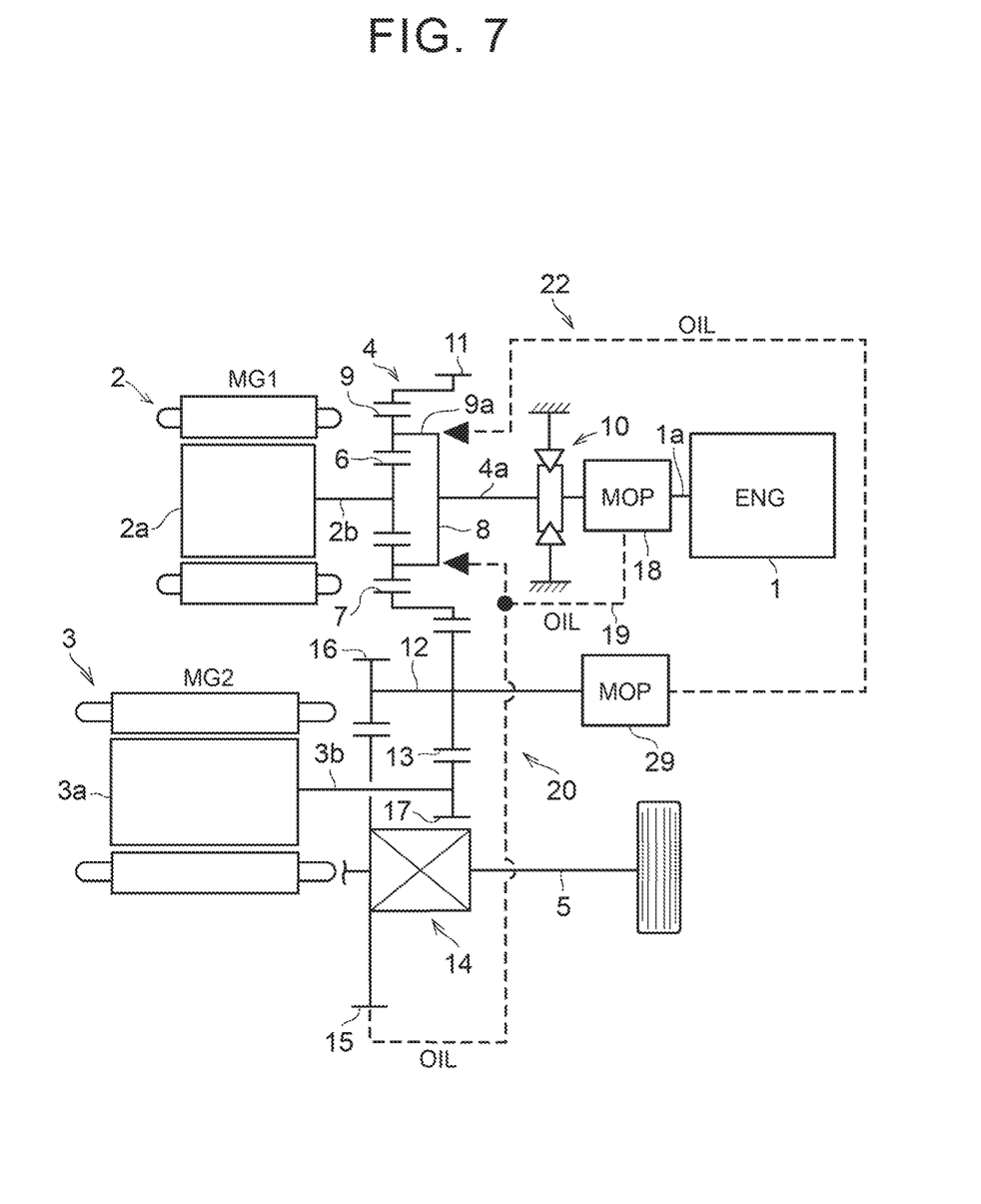
FIG. 7 is a view that shows another example of the oil supply mechanism in the lubricating structure according to a non-limiting illustrative embodiment.

The oil supply mechanism 22 shown in FIG. 7 includes an oil pump 29 instead of the EOP 21 in the configuration shown in FIG. 1. The oil pump 29 (hereinafter, MOP 29), as well as the MOP 18, is a conventional general mechanical oil pump. The MOP 29 is configured to generate hydraulic pressure when the MOP 29 is driven by torque that is transmitted from the drive shaft 5 side. Specifically, the rotor of the MOP 29 is configured to rotate together with the drive shaft 5. Therefore, even when the rotation of the output shaft 1a of the engine 1 is stopped, the MOP 29 is driven in a state where the vehicle Ve is traveling and the drive shaft 5 is rotating. Therefore, it is possible to supply oil to the planetary gear mechanism PG by generating hydraulic pressure with the use of the MOP 29.

When the thus configured MOP 29 is used, the amount of oil that is supplied to the pinion gears 9 increases as the vehicle speed increases. Therefore, for example, even at a high vehicle speed that exceeds the vehicle speed $V_2$ shown in FIG. 9, it is possible to ensure lubrication and cooling performance for the pinion gears 9.

Figure 8:
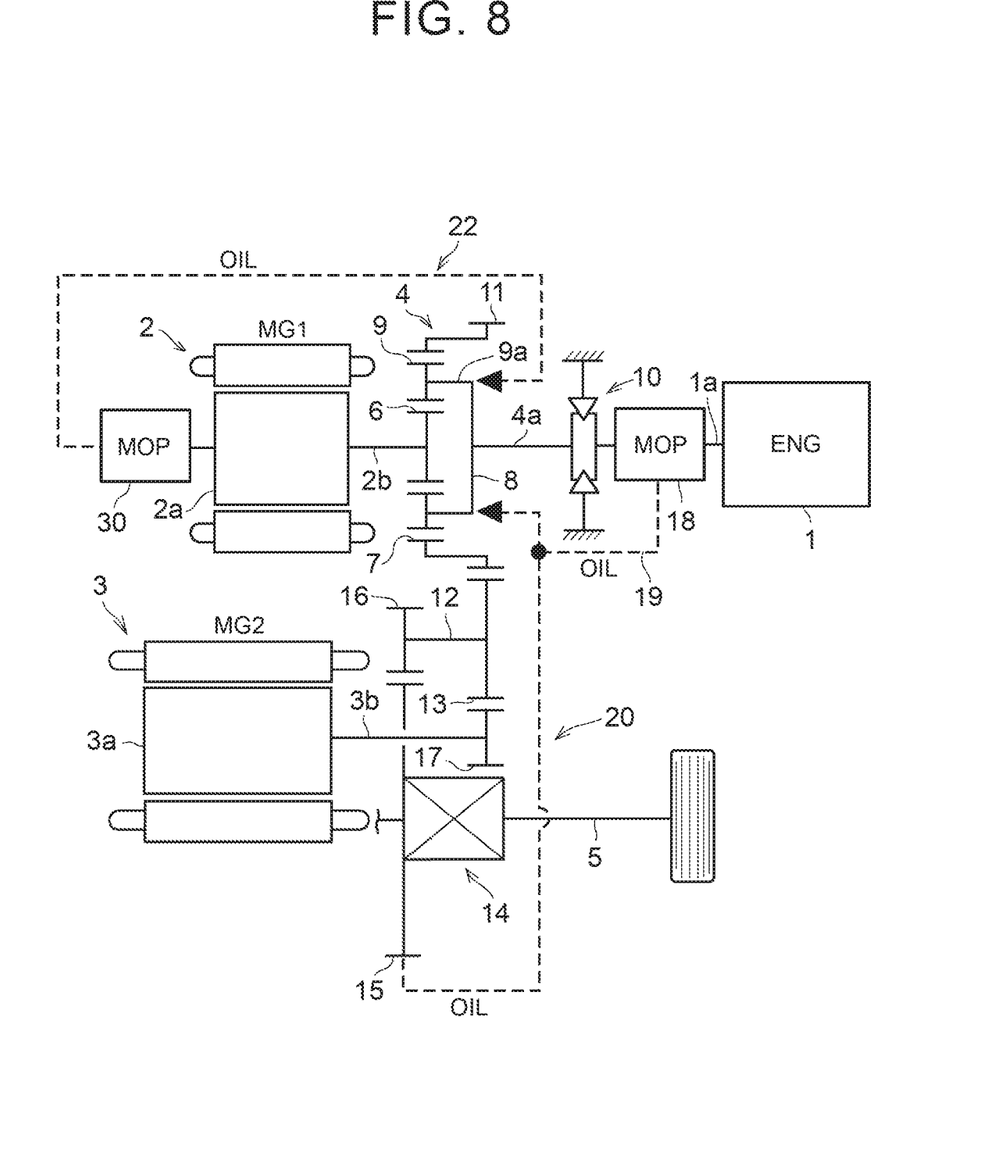
FIG. 8 is a view that shows another example of the oil supply mechanism in the lubricating structure according to a non-limiting illustrative embodiment.

The oil supply mechanism 22 shown in FIG. 8 includes an oil pump 30 instead of the EOP 21 in the configuration shown in FIG. 1. The oil pump 30 (hereinafter, MOP 30), as well as the above-described MOP 18 or MOP 29, is a conventional general mechanical oil pump. The MOP 30 is configured to generate hydraulic pressure when the MOP 30 is driven by torque that is transmitted from the first motor 2. Specifically, the rotor of the MOP 30 is configured to rotate together with the rotor shaft 2b of the first motor 2. Therefore, even when the rotation of the output shaft 1a of the engine 1 is stopped, the MOP 30 is driven in a state were the first motor 2 is rotating. Therefore, it is possible to supply oil to the planetary gear mechanism PG by generating hydraulic pressure with the use of the MOP 30.

It is possible to obtain the discharge amount of oil in response to the rotation speed of the first motor 2 with the use of the thus configured MOP 30. Therefore, even during motor running in the twin-drive mode in which the first motor 2 outputs torque, it is possible to ensure lubrication and cooling performance for the pinion gears 9.

Although the above exemplary embodiments of the present application have been described, it will be understood by those skilled in the art that the present application should not be limited to the described exemplary embodiments, and various changes and modifications can be made within the spirit and scope of the present application.

The invention claimed is:

1. A lubricating structure for a hybrid vehicle, the vehicle including an engine, a first motor, and a second motor as driving force sources, the lubricating structure comprising:
a planetary gear mechanism including a sun gear, a ring gear, a carrier, and pinion gears, the first motor being coupled to the sun gear, an output shaft being coupled to the ring gear, and the engine being coupled to the carrier;
a brake mechanism to selectively fix the carrier by stopping rotation of the carrier;
an oil pump that is driven by a predetermined power to generate a hydraulic pressure of oil in a state in which the rotation of the carrier is stopped by the brake mechanism;
a first oil supply mechanism to feed the oil to an axis portion of each of the pinion gears by the oil pump generating the hydraulic pressure;
a third motor; and
an electronic controller, wherein
the oil pump is an electric oil pump that is driven by the third motor to generate the hydraulic pressure,
the electronic controller is configured to control a rotation state of each of the driving force sources and a rotation state of the third motor, and
when a temperature of the oil falls below a predetermined temperature, the electronic controller is configured to prohibit driving of at least one of the first motor and the second motor in response to the temperature of the oil falling below the predetermined temperature.

2. The lubricating structure according to claim 1, wherein the electronic controller is configured to, when both the first motor and the second motor output torque, control the third motor such that the oil pump generates the hydraulic pressure.

3. The lubricating structure according to claim 2, further comprising:
a second oil supply mechanism to supply the planetary gear mechanism with oil that is splashed when a predetermined gear rotates, wherein
the electronic controller is configured to, when a vehicle speed falls outside a predetermined vehicle speed range, control the third motor such that the oil pump generates the hydraulic pressure, and the predetermined vehicle speed range is set as a vehicle speed range in which a predetermined amount of oil is supplied by the second oil supply mechanism.

* * * * *